(12) United States Patent
Bak et al.

(10) Patent No.: US 12,428,990 B2
(45) Date of Patent: Sep. 30, 2025

(54) GAS TURBINE PLANT WITH AMMONIA DECOMPOSITION SYSTEM

(71) Applicant: DOOSAN ENERBILITY CO., LTD., Changwon-si (KR)

(72) Inventors: Byoung Gu Bak, Suwon-si (KR); Jin Il Kim, Changwon-si (KR); Tae Woo Kim, Yongin-si (KR); Hong Geun Ha, Yongin-si (KR); Young Hoon Bae, Changwon-si (KR); Chil Yeong Seon, Yongin-si (KR); Ki Hyun Lee, Daegu (KR); Kwang Hun Jeong, Gimhae-si (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 0 days.

(21) Appl. No.: 18/677,579

(22) Filed: May 29, 2024

(65) Prior Publication Data
US 2024/0401526 A1 Dec. 5, 2024

(30) Foreign Application Priority Data
May 30, 2023 (KR) .................. 10-2023-0069376

(51) Int. Cl.
| | |
|---|---|
| *F02C 6/18* | (2006.01) |
| *B01D 53/14* | (2006.01) |
| *B01D 53/18* | (2006.01) |
| *F23R 3/28* | (2006.01) |

(52) U.S. Cl.
CPC ............ *F02C 6/18* (2013.01); *B01D 53/1418* (2013.01); *B01D 53/1425* (2013.01); *B01D 53/18* (2013.01); *F23R 3/28* (2013.01); *B01D 2252/103* (2013.01); *B01D 2257/406* (2013.01); *F05D 2220/62* (2013.01)

(58) Field of Classification Search
CPC .......... F01K 23/10; F01K 7/18; F01K 25/103; C01B 3/04; B01J 19/0013; B01J 19/0053; F02C 6/18; B01D 52/1425; B01D 52/1418; B01D 52/18; F01N 3/08
See application file for complete search history.

(56) References Cited

U.S. PATENT DOCUMENTS

| | | |
|---|---|---|
| 5,852,925 A | 12/1998 | Prasad et al. |
| 11,156,168 B2 | 10/2021 | Nose |
| 11,679,977 B2 | 6/2023 | Al-Huwaider |
| 11,912,574 B1 | 2/2024 | Jo |
| 11,939,915 B2 | 3/2024 | Uechi |

(Continued)

FOREIGN PATENT DOCUMENTS

| | | | | |
|---|---|---|---|---|
| CN | 119222016 A | * | 12/2024 | |
| EP | 4227501 A1 | * | 8/2023 | ........... B01D 53/002 |

(Continued)

*Primary Examiner* — Craig Kim
(74) *Attorney, Agent, or Firm* — Shook, Hardy & Bacon L.L.P.

(57) ABSTRACT

The present disclosure relates to a gas turbine plant which decomposes ammonia and supplies it as fuel to a combustor of the gas turbine. The purpose of the embodiment of the present disclosure is that the gas turbine plant supplies sufficient heat to the ammonia in order to thermally decompose the ammonia effectively, and separates the residual ammonia present in the decomposition gas and supplies it to a combustor of the gas turbine.

19 Claims, 10 Drawing Sheets

(56) References Cited

U.S. PATENT DOCUMENTS

| | | |
|---|---|---|
| 2007/0214766 A1 | 9/2007 | Obana |
| 2018/0355794 A1 | 12/2018 | Bulat |
| 2019/0084831 A1 | 3/2019 | Andersen |
| 2019/0107048 A1 | 4/2019 | Bulat |
| 2020/0032676 A1* | 1/2020 | Nose ............... F23R 3/36 |
| 2021/0332759 A1 | 10/2021 | Smith |
| 2022/0099021 A1 | 3/2022 | Uechi |
| 2022/0154646 A1* | 5/2022 | Araki ............... C01B 3/047 |
| 2022/0162989 A1* | 5/2022 | Cocks ............... F02C 3/22 |
| 2022/0162999 A1* | 5/2022 | Cocks ............... C01B 3/047 |
| 2022/0299205 A1* | 9/2022 | MacDonald ........ F02C 6/003 |
| 2023/0129294 A1 | 4/2023 | Cocks |
| 2023/0313735 A1 | 10/2023 | Smith |
| 2023/0407784 A1 | 12/2023 | Takeishi |
| 2024/0019124 A1 | 1/2024 | Ito |
| 2024/0068416 A1 | 2/2024 | Hagita |
| 2024/0093639 A1* | 3/2024 | Ikeda ............... F02C 3/22 |
| 2024/0117763 A1* | 4/2024 | Ito ............... C01B 3/501 |
| 2024/0167417 A1* | 5/2024 | Lin ............... F02C 3/22 |
| 2024/0183310 A1* | 6/2024 | Uechi ............... F01K 23/10 |
| 2024/0328358 A1 | 10/2024 | Barth |
| 2024/0401521 A1* | 12/2024 | Bak ............... F02C 7/224 |
| 2024/0401525 A1* | 12/2024 | Bak ............... B01D 53/8625 |

FOREIGN PATENT DOCUMENTS

| | | | | |
|---|---|---|---|---|
| JP | 2943851 A | | 9/1999 | |
| JP | 2015021499 A | | 2/2015 | |
| JP | 2016085189 A | | 5/2016 | |
| JP | 2018076794 A | | 5/2018 | |
| JP | 2020147478 A | | 9/2020 | |
| JP | 2020148183 A | * | 9/2020 | ......... B01J 19/0013 |
| KR | 20130071099 A | | 6/2013 | |
| KR | 20140001773 A | | 1/2014 | |
| KR | 20210096274 A | | 8/2021 | |
| KR | 20210121192 A | | 10/2021 | |
| KR | 20220141943 A | | 10/2022 | |
| KR | 20230060372 A | | 5/2023 | |
| WO | WO-2023162600 A1 | * | 8/2023 | ............ F01K 23/10 |
| WO | WO-2024100987 A1 | * | 5/2024 | |

\* cited by examiner

GAS TURBINE PLANT WITH AMMONIA DECOMPOSITION SYSTEM

CROSS-REFERENCE TO RELATED APPLICATIONS

The present application claims priority to Korea Patent Application No. 10-2023-0069376, filed May 30, 2023, the entire contents of which is incorporated herein for all purposes by this reference.

FIELD

The present disclosure relates to a gas turbine plant with an ammonia decomposition system and more particularly to a gas turbine plant which decomposes ammonia and supplies it as fuel to a combustor of the gas turbine.

BACKGROUND

For the purpose of reducing the emission amount of carbon dioxide in order to preserve global environment, it is a promising option to use hydrogen as a fuel which does not emit carbon dioxide even when combusted. However, compared to a fuel such as liquefied natural gas which is widely used as a fuel for a gas turbine, hydrogen is not easy to transport or store. Therefore, it is being considered that ammonia that can be converted to hydrogen is used as a fuel.

Japanese Patent No. 2948351 discloses a gas turbine plant equipped with a decomposition device that heats ammonia and decomposes it into hydrogen and nitrogen. The decomposition device of the gas turbine plant heats ammonia by performing heat exchange between liquid ammonia with pressure increased by a pressure pump and exhaust gas discharged from the gas turbine, thereby thermally decomposing the ammonia into decomposition gas containing hydrogen and nitrogen. This decomposition gas is supplied as it is to a combustor of the gas turbine.

However, the liquid ammonia may not be sufficiently heated by the exhaust gas. In this case, a large amount of ammonia in addition to hydrogen and nitrogen often remains in the decomposition gas. When the decomposition gas is supplied to the combustor of the gas turbine and the residual ammonia is combusted, there is a problem that a large amount of nitrogen oxides (NOx) is generated.

SUMMARY

The purpose of the present disclosure is to provide a gas turbine plant that decomposes ammonia and supplies it as fuel to a combustor of a gas turbine. The gas turbine plant supplies sufficient heat to the ammonia in order to thermally decompose the ammonia effectively, and separates the residual ammonia present in the decomposition gas and supplies it to a combustor of the gas turbine.

The technical problem to be overcome in this document is not limited to the above-mentioned technical problems. Other technical problems not mentioned can be clearly understood from those described below by a person having ordinary skill in the art.

One embodiment is a gas turbine plant with an ammonia decomposition system. The gas turbine plant includes: a storage tank configured to store liquid ammonia; a supply pump configured to supply the liquid ammonia of the storage tank; a preheater configured to preheat the liquid ammonia supplied by the supply pump; a vaporizer configured to vaporize the liquid ammonia preheated by the preheater; a superheater configured to superheat gaseous ammonia vaporized by the vaporizer; a decomposition reactor configured to thermally decompose the gaseous ammonia superheated by the superheater; an ammonia absorption tower configured to separate residual ammonia from decomposition gas decomposed in the decomposition reactor and generate synthesis gas consisting of hydrogen and nitrogen; and an ammonia regeneration tower configured to evaporate and regenerate ammonia from ammonia water produced by dissolving the residual ammonia in water in the ammonia absorption tower. The synthesis gas generated in the ammonia absorption tower is supplied to a first combustor of a gas turbine.

The gaseous ammonia regenerated in the ammonia regeneration tower may be mixed with the gaseous ammonia vaporized in the vaporizer and may be supplied to the superheater.

The gaseous ammonia regenerated in the ammonia regeneration tower may be compressed by a gas compressor before being mixed with the gaseous ammonia vaporized in the vaporizer.

Water discharged from the ammonia regeneration tower may be branched and a portion of the water may be supplied to the ammonia absorption tower, and the other portion may be supplied back to the ammonia regeneration tower through a reboiler. The water passing through the reboiler directly or indirectly may exchange heat with the decomposition gas.

The gas turbine plant may further include a heat transfer fluid circuit through which a heat transfer fluid flows. The heat transfer fluid circuit may include a pump, a first heat exchanger that absorbs heat by exchanging heat with the decomposition gas, and the reboiler that supplies heat by exchanging heat with water.

The gas turbine plant may further include a second combustor that generates combustion gas such that heat is supplied to the decomposition reactor. Water discharged from the ammonia regeneration tower may be branched and a portion of the water may be supplied to the ammonia absorption tower, and the other portion may be supplied back to the ammonia regeneration tower through a reboiler. The water passing through the reboiler directly or indirectly may exchange heat with the combustion gas.

The gas turbine plant may further include a heat transfer fluid circuit through which a heat transfer fluid flows. The heat transfer fluid circuit may include a pump, a first heat exchanger that absorbs heat by exchanging heat with the combustion gas, and the reboiler that supplies heat by exchanging heat with water.

Exhaust gas discharged from the gas turbine may be supplied to a heat recovery steam generator. Steam generated by heat of the exhaust gas in the heat recovery steam generator may be supplied to a steam turbine and drives the steam turbine, and then may flow into a condenser, and water condensed in the condenser may be supplied back to the heat recovery steam generator. A portion of the water condensed in the condenser may be supplied as the heat transfer fluid to the heat transfer fluid circuit.

The heat transfer fluid circuit may further include an internal heat exchanger in which the water discharged from the condenser and the water entering the condenser exchange heat.

The water discharged from the condenser may absorb heat while passing through the internal heat exchanger, may absorb heat while passing through the first heat exchanger, and then may supply the heat while passing through the reboiler, may supply heat while passing through the internal heat exchanger, and then may flow back into the condenser.

The combustion gas may supply heat while passing through the decomposition reactor and the superheater. The water passing through the reboiler may be supplied with heat directly or indirectly from the combustion gas that has passed through the decomposition reactor and the superheater.

The gaseous ammonia regenerated in the ammonia regeneration tower may exchange heat with the liquid ammonia while passing through the preheater.

The gas turbine plant may further include a separation tank that separates the liquid ammonia condensed as the gaseous ammonia regenerated in the ammonia regeneration tower passes through the preheater from uncondensed gaseous ammonia. The liquid ammonia separated in the separation tank may be recovered back to the ammonia regeneration tower, and the separated gaseous ammonia may be mixed with the gaseous ammonia vaporized by the vaporizer and may be supplied to the superheater.

Water discharged from the ammonia regeneration tower may be branched and a portion of the water may be supplied to the ammonia absorption tower, and the other portion may be supplied back to the ammonia regeneration tower through a reboiler. Exhaust gas discharged from the gas turbine may be supplied to a heat recovery steam generator, and the water may be heated by heat of the exhaust gas in the heat recovery steam generator. The water passing through the reboiler may exchange heat with steam or water extracted from the heat recovery steam generator.

The gas turbine plant may further include an additional reboiler that is disposed upstream or downstream of the reboiler. Water passing through the additional reboiler directly or indirectly may exchange heat with the decomposition gas.

The gas turbine plant may further include: a second combustor that generates combustion gas such that heat is supplied to the decomposition reactor; and an additional reboiler that is disposed upstream or downstream of the reboiler. Water passing through the additional reboiler directly or indirectly may exchange heat with the combustion gas.

The gaseous ammonia regenerated in the ammonia regeneration tower may be liquefied in a liquefier, and then may be supplied to the vaporizer.

A portion of the steam or water extracted from the heat recovery steam generator may be branched before being supplied to the reboiler, and may be supplied to at least one of the preheater, the vaporizer and the superheater.

According to the embodiment, as the ammonia decomposition system includes the preheater, the vaporizer, and the superheater, which are for heating the ammonia before the decomposition reactor, sufficient heat can be supplied to the ammonia. Also, when the combustion gas generated by a separate second combustor supplies heat to the decomposition reactor, the ammonia can be thermally decomposed effectively at a high temperature.

Also, the water is heated in the reboiler by using the decomposition gas or the combustion gas generated within the plant or steam/water extracted from the heat recovery steam generator, so that the efficiency of the plant can be improved.

Also, the gaseous ammonia regenerated in the ammonia regeneration tower exchanges heat with the liquid ammonia while passing through the preheater. Accordingly, the regenerated gaseous ammonia is condensed by a predetermined amount, and the liquid ammonia supplied to the vaporizer can be heated.

The effect of the present disclosure is not limited to the above effects and should be construed as including all the effects that can be inferred from the configuration of the present disclosure disclosed in the detailed description or claims of the present disclosure.

DETAILED DESCRIPTION

Figure 1:
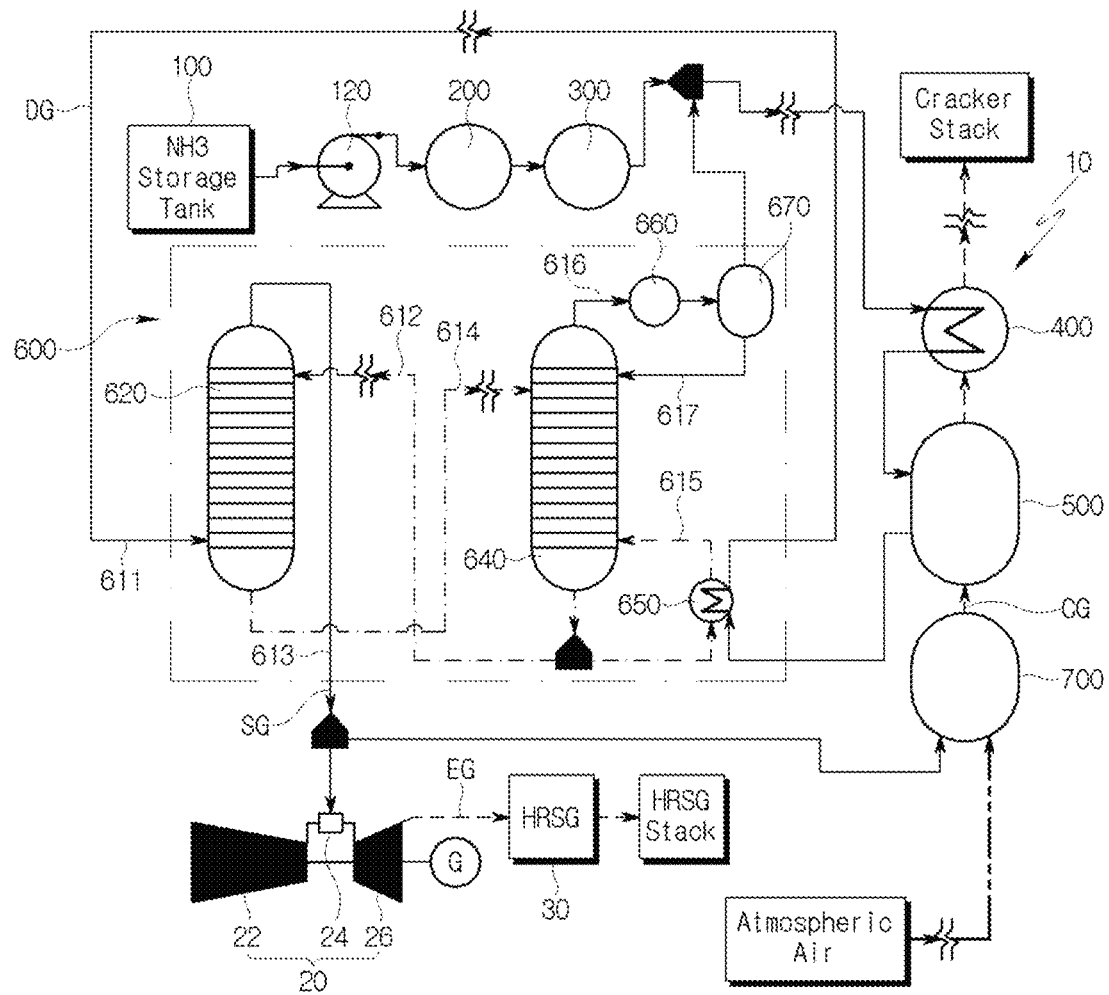
FIG. 1 is a schematic diagram of a gas turbine plant with an ammonia decomposition system according to an embodiment described herein.

Hereinafter, preferable embodiments of a gas turbine plant with an ammonia decomposition system will be described with reference to accompanying drawings.

Also, the below-mentioned terms are defined in consideration of the functions in the present disclosure and may be changed according to the intention of users or operators or custom. The following embodiments do not limit the scope of the present disclosure and are merely exemplary of the components presented in the claims of the present disclosure.

Parts irrelevant to the description will be omitted for a clear description of the present disclosure. The same or similar reference numerals will be assigned to the same or similar components throughout this specification. Throughout this specification, when it is mentioned that a portion "includes" an element, it means that the portion does not exclude but further includes other elements unless there is a special opposite mention.

First, a gas turbine plant including an ammonia decomposition system according to an embodiment of the present disclosure will be described with reference to FIG. 1.

The gas turbine plant according to the embodiment generally includes an ammonia decomposition system 10, a gas turbine 20, and a heat recovery steam generator (HRSG) 30.

The ammonia decomposition system 10 includes a storage tank 100, a supply pump 120, a preheater 200, a vaporizer 300, a superheater 400, a decomposition reactor 500, a separator 600, and a second combustor 700.

The gas turbine 20 includes a compressor 22 for compressing air to high pressure, a first combustor 24 for mixing the air compressed by the compressor 22 with fuel and for combusting, and a turbine 26 for generating power while rotating turbine blades by using high-temperature and high-pressure combustion gas discharged from the first combustor 24.

In the embodiment of the present disclosure, synthesis gas based on hydrogen decomposed in the ammonia decomposition system 10 as a main component is supplied as fuel for the first combustor 24. It is shown in the drawing that only the synthesis gas is supplied. However, in some cases, it is also possible that the synthesis gas and natural gas are supplied to the first combustor 24 together and mixed and combusted.

Exhaust gas (EG) discharged from the turbine 26 of the gas turbine 20 is supplied to the heat recovery steam generator 30 and vaporizes water into steam within the heat recovery steam generator 30. The steam generated in the heat recovery steam generator 30 is supplied to a steam turbine (not shown) to generate electricity.

Hereinafter, each component of the ammonia decomposition system 10 will be described in detail. FIG. 1 shows a flow of ammonia or ammonia-decomposed gas passing through the components of the ammonia decomposition system 10, and adjacent components will be connected to each other through connection pipes, etc.

The storage tank 100 stores liquid ammonia, and the supply pump 120 increases the pressure of the liquid ammonia of the storage tank 100 and supplies the liquid ammonia to the preheater 200.

Subsequently, the preheater 200, the vaporizer 300, and the superheater 400 are configured to vaporize and heat the liquid ammonia prior to the decomposition reactor 500. Specifically, the preheater 200 preheats the liquid ammonia supplied by the supply pump 120. The vaporizer 300 vaporizes the liquid ammonia preheated by the preheater 200. The superheater 400 superheats the gaseous ammonia vaporized by the vaporizer 300.

As one example, when the supply pump 120 increases the pressure of the liquid ammonia to 40 atm, a boiling point of the ammonia at 40 atm is around 100° C. In this case, the preheater 200 heats the liquid ammonia to below the boiling point, and the vaporizer 300 heats the liquid ammonia to the boiling point and generates gaseous ammonia. The superheater 400 additionally heats the gaseous ammonia.

The decomposition reactor 500 thermally decomposes the gaseous ammonia superheated by the superheater 400 and generates decomposition gas (DG) containing hydrogen, nitrogen, and residual ammonia. A catalyst that promotes the thermal decomposition of the ammonia may be filled in the decomposition reactor 500. The catalyst has a catalyst component that activates a decomposition reaction, and a carrier that supports the catalyst component. An example of the catalyst component includes particles of precious metal such as Ru, etc., and metal particles including transition metals such as Ni, Co, and Fe, etc. The carrier includes a metal oxide such as $Al_2O_3$, $ZrO_2$, $Pr_2O_3$, $La_2O_3$, MgO, etc. The catalyst is not limited to the catalysts exemplified above as long as the catalyst activates the decomposition reaction of ammonia.

The separator 600 separates residual ammonia from the decomposition gas (DG) decomposed in the decomposition reactor 500. Then, the residual ammonia is removed in the separator 600, the synthesis gas (SG) consisting of hydrogen and nitrogen is supplied to the first combustor 24 of the gas turbine. Here, the residual ammonia separated by the separator 600 may be mixed with the gaseous ammonia vaporized by the vaporizer 300 and may be supplied to the superheater 400. Since ammonia is highly soluble in water, the separator 600 can remove the residual ammonia by dissolving the residual ammonia in water. Also, ammonia is easier to evaporate than water. Therefore, when ammonia water that is obtained by dissolving the residual ammonia in water is heated, gaseous ammonia can be separated again. The detailed configuration of the separator 600 will be described below.

Here, a reaction temperature for the thermal decomposition of the ammonia (depending on the catalyst, generally 400° C. to 700° C.) is much higher than a boiling point of ammonia. Therefore, the superheater 400 and the decomposition reactor 500 requires a higher temperature heat source than the preheater 200 and the vaporizer 300.

To this end, the ammonia decomposition system 10 includes the second combustor 700 that generates combustion gas (CG) such that heat is supplied to the decomposition reactor 500. In the embodiment, the combustion gas (CG) generated by the second combustor 700 supplies heat while passing through the decomposition reactor 500 and the superheater 400. However, the embodiment is not limited to this, and the combustion gas (CG) may additionally pass through the preheater 200 or the vaporizer 300.

The combustion gas (CG) generated from the second combustor 700 generally has a temperature of about 1000° C., which is higher than that of the exhaust gas (EG) discharged from the gas turbine 20. Therefore, by using the combustion gas (CG) with the inclusion of the separate second combustor 700, the ammonia can be effectively thermally decomposed by the decomposition reactor 500 even without using a high-performance catalyst, and the efficiency of the decomposition reactor 500 can be improved.

However, according to the embodiment, when the separate second combustor 700 is not included, at least a portion of the exhaust gas (EG) discharged from the gas turbine 20 may supply heat while passing through the decomposition reactor 500 and the superheater 400. In this case, the exhaust gas (EG) discharged from the gas turbine 20 is branched and a portion of the exhaust gas (EG) may be supplied to the decomposition reactor 500, and the other portion may be supplied to the heat recovery steam generator 30. Alternatively, the exhaust gas (EG) discharged from the gas turbine 20 may supply heat while passing through the decomposition reactor 500 and the superheater 400 in turn, and then may be supplied to the heat recovery steam generator 30.

As such, the ammonia decomposition system 10 may include the preheater 200, the vaporizer 300, and the superheater 400, which are for heating the ammonia before the decomposition reactor 500, and the exhaust gas (EG) or the combustion gas (CG) generated by the separate second combustor 700 supplies heat to the decomposition reactor 500. Accordingly, sufficient heat can be supplied to the ammonia and the ammonia can be thermally decomposed effectively.

Accordingly, there is not much residual ammonia in the decomposition gas (DG), and the residual ammonia is reliably removed through the separator 600 and the decomposition gas (DG) is supplied to the first combustor 24, thereby reducing nitrogen oxides in the exhaust gas (EG).

Separate fuel such as fossil fuel may be supplied to the second combustor 700. However, it is desirable that a portion of the ammonia, the decomposition gas (DG) or the synthesis gas (SG) present in the ammonia decomposition system 10 should be supplied as fuel to the second combustor 700 in order that the system is simplified and carbon dioxide is not emitted. In the embodiment shown in FIG. 1, a portion of the synthesis gas (SG) from which residual ammonia has been removed in the separator 600 is supplied to the second combustor 700 and combusted.

Air may be supplied to the second combustor 700 in order to supply an oxidant (oxygen). Alternatively, since a large amount of residual oxygen exists in the exhaust gas (EG), a portion of the exhaust gas (EG) may be supplied as an oxidant to the second combustor 700. If necessary, it is possible that the exhaust gas (EG) and the air are supplied together.

Next, the structure of the separator 600 will be described in detail.

In the embodiment, the separator 600 includes an ammonia absorption tower 620, an ammonia regeneration tower 640, a reboiler 650, a condenser 660, and a separation tank 670. In the embodiment, water passing through the reboiler 650 may directly or indirectly exchange heat with the decomposition gas (DG) or the combustion gas (CG). In this way, the water is heated in the reboiler 650 by using the decomposition gas (DG) or the combustion gas (CG) generated within the plant, so that the efficiency of the plant can be improved. In FIG. 1, the description will be made based on the fact that the water passing through the reboiler 650 directly exchanges heat with the decomposition gas (DG).

The ammonia absorption tower 620 separates the residual ammonia from the decomposition gas (DG) decomposed in the decomposition reactor 500, and then generates the synthesis gas (SG) consisting of hydrogen and nitrogen. Specifically, the ammonia absorption tower 620 is connected with a decomposition gas line 611 into which the decomposition gas (DG) flows, a water line 612 into which water flows, a synthesis gas line 613 through which the synthesis gas (SG) from which the residual ammonia has been removed is discharged, and an ammonia water line 614 through which ammonia water produced by dissolving the residual ammonia in water is discharged. In particular, it is preferable that the decomposition gas line 611 should be connected to a lower portion of the ammonia absorption tower 620 and the water line 612 should be connected to an upper portion of the ammonia absorption tower 620. Accordingly, within the ammonia absorption tower 620, the water falls from the top and the decomposition gas (DG) rises from the bottom, and as they meet, residual ammonia contained in the decomposition gas (DG) may be dissolved in the water. More specifically, a filler may be provided within the ammonia absorption tower 620. The water may come into contact with the filler while falling, and then may form a water film that covers the surface of the filler. Also, the decomposition gas (DG) may come into contact with the water film while rising. Thereafter, the synthesis gas (SG) may rise within the ammonia absorption tower 620 and may be discharged from the top through the synthesis gas line 613 and be supplied to the first combustor 24 of the gas turbine. The ammonia water may collect in the lower portion of the ammonia absorption tower 620 and may be discharged through the ammonia water line 614, and then may be supplied to the ammonia regeneration tower 640.

Here, although not shown, a water supply pump or a water cooler may be further provided on the water line 612.

The ammonia regeneration tower 640 evaporates and regenerates ammonia from the ammonia water generated in the ammonia absorption tower 620. Specifically, the ammonia regeneration tower 640 is connected with the ammonia water line 614 into which the ammonia water flows, a vapor line 615 into which vapor flows, a regeneration ammonia line 616 through which the regenerated gaseous ammonia is discharged, and the water line 612 through which condensed water is discharged. In particular, it is preferable that the ammonia water line 614 should be connected to an upper portion of the ammonia regeneration tower 640 and the vapor line 615 should be connected to a lower portion of the ammonia regeneration tower 640. Accordingly, within the ammonia regeneration tower 640, the ammonia water falls from the top and vapor rises from the bottom, and as they meet, the ammonia evaporates and the vapor condenses through gas-liquid contact. More specifically, a porous plate type shelf is provided within the ammonia regeneration tower 640. The ammonia water may form a liquid layer on the shelf while falling, and the vapor may come into gas-liquid contact via a number of holes formed in the shelf while rising. Thereafter, the regenerated gaseous ammonia rises within the ammonia regeneration tower 640 and is discharged from the top through the regeneration ammonia line 616, and the condensed water (more precisely, the remaining water after the evaporation of the ammonia from the ammonia water and the water resulting from the condensation of the vapor) collect in the lower portion of the ammonia regeneration tower 640 and is discharged through the water line 612.

Here, the water discharged from the ammonia regeneration tower 640 is branched and a portion of the water is supplied to the ammonia absorption tower 620, and the other portion is supplied back to the ammonia regeneration tower 640 through the reboiler 650. For this purpose, the water line 612 is divided into two lines downstream of the ammonia regeneration tower 640. One water line is connected to the ammonia absorption tower 620 and the other one is connected to the reboiler 650. The vapor line 615 is also connected to the reboiler 650, and the water discharged from the ammonia regeneration tower 640 is heated in the reboiler 650 and turns to vapor, and then is circulated back to the ammonia regeneration tower 640.

In the embodiment, the decomposition gas (DG) discharged from the decomposition reactor 500 transfers heat directly to the water through the reboiler 650 and is then supplied to the ammonia absorption tower 620. Accordingly, the water may be converted to vapor in the reboiler 650 by the heat of the decomposition gas (DG), and the decomposition gas (DG) may be cooled in the reboiler 650 and then may flow into the ammonia absorption tower 620.

The gaseous ammonia discharged through the regeneration ammonia line 616 may be cooled while passing through the condenser 660 and be condensed by a predetermined amount, and thus, the liquid ammonia may be generated. Separate coolant, etc. may be supplied to the condenser 660 to cool the gaseous ammonia. The separation tank 670 is disposed downstream of the condenser 660 and serves to separate the liquid ammonia condensed in the condenser 660 from the uncondensed gaseous ammonia by a density difference. The liquid ammonia separated by the separation tank 670 may be recovered back to the ammonia regeneration tower 640 through the ammonia recovery line 617, and the separated gaseous ammonia is mixed with the gaseous ammonia vaporized by the vaporizer 300 and may be supplied to the superheater 400. It is preferable that the ammonia recovery line 617 should be connected to an upper portion of the ammonia regeneration tower 640.

Figure 2:
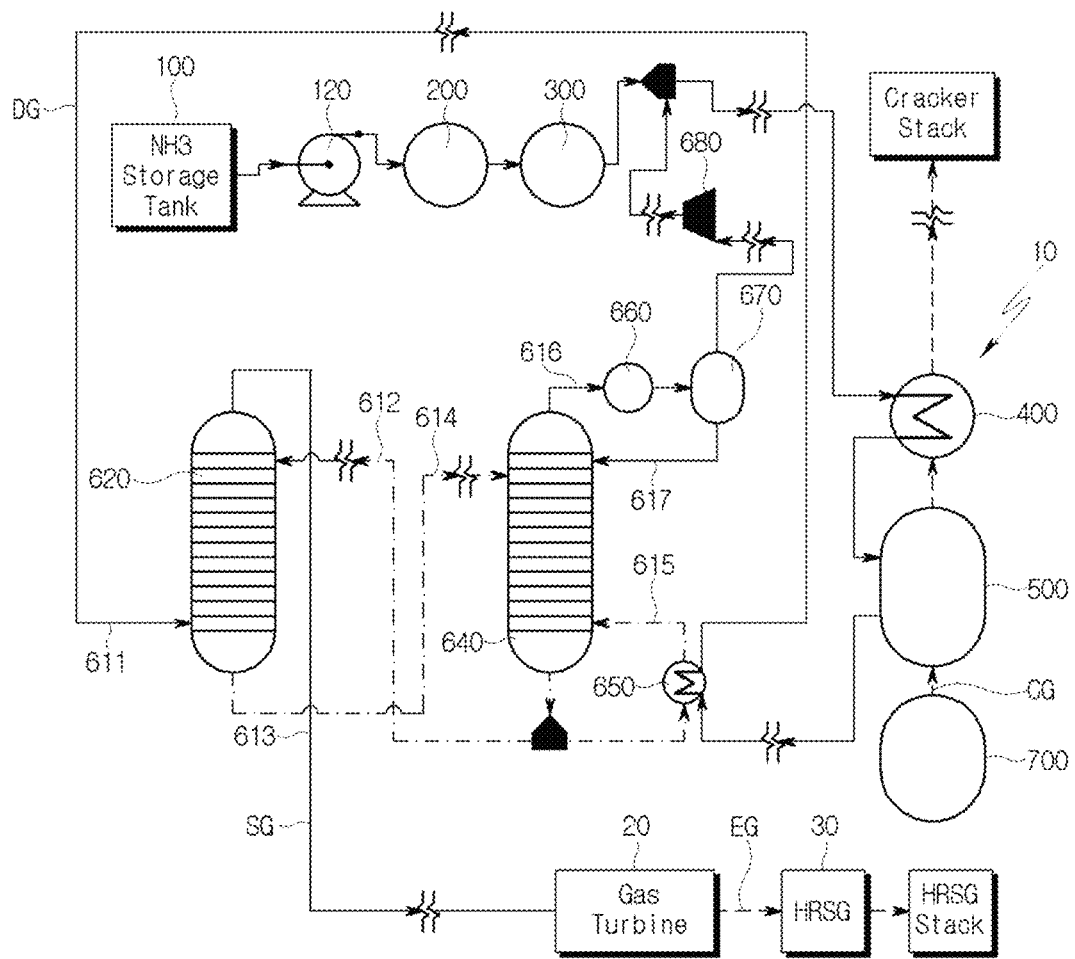
FIG. 2 is a schematic diagram of a gas turbine plant with an ammonia decomposition system according to an embodiment described herein.

According to the embodiment, as shown in FIG. 2, the gaseous ammonia regenerated in the ammonia regeneration tower 640, more precisely, the gaseous ammonia separated by the separation tank 670 may be compressed by a gas compressor 680 before being mixed with the gaseous ammonia vaporized by the vaporizer 300. The pressure of the regenerated gaseous ammonia may be increased by the gas compressor 680 such that the regenerated gaseous ammonia has the same pressure as that of the gaseous ammonia downstream of the vaporizer 300.

The following embodiments will focus on differences from the embodiment shown in FIG. 1.

Figure 3:
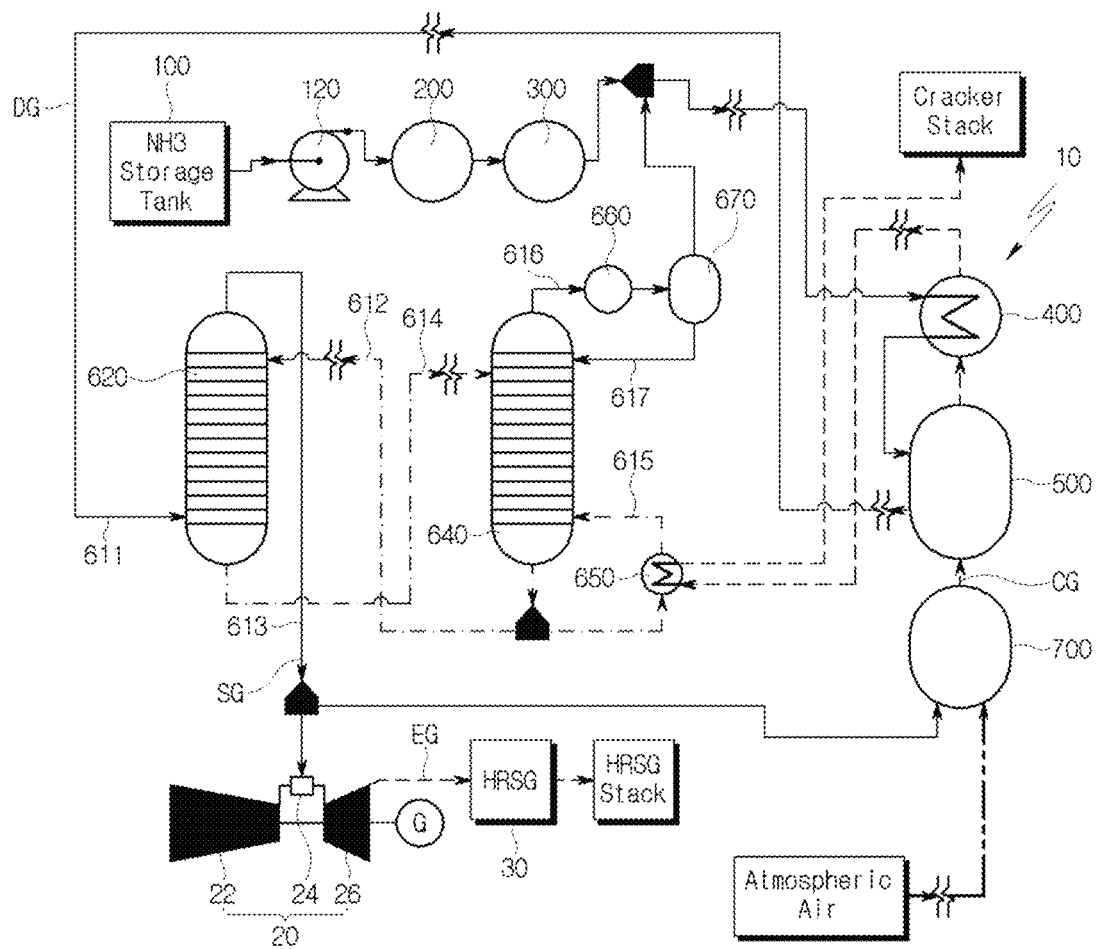
FIG. 3 is a schematic diagram of a gas turbine plant with an ammonia decomposition system according to an embodiment described herein.

According to the embodiment shown in FIG. 3, water passing through the reboiler 650 is directly exchanging heat with the combustion gas (CG). Specifically, the combustion gas (CG) discharged from the second combustor 700 supplies heat while passing through the decomposition reactor 500 and the superheater 400, and then transfers the heat directly to the water through the reboiler 650. Accordingly, the water may be converted to vapor in the reboiler 650 by the heat of the combustion gas (CG), and the combustion gas (CG) may be cooled in the reboiler 650.

In the embodiment, the decomposition gas (DG) is supplied directly from the decomposition reactor 500 to the ammonia absorption tower 620. Also, according to the embodiment, it is also possible that the decomposition gas (DG) passes through the vaporizer 300, etc.

Figure 4:
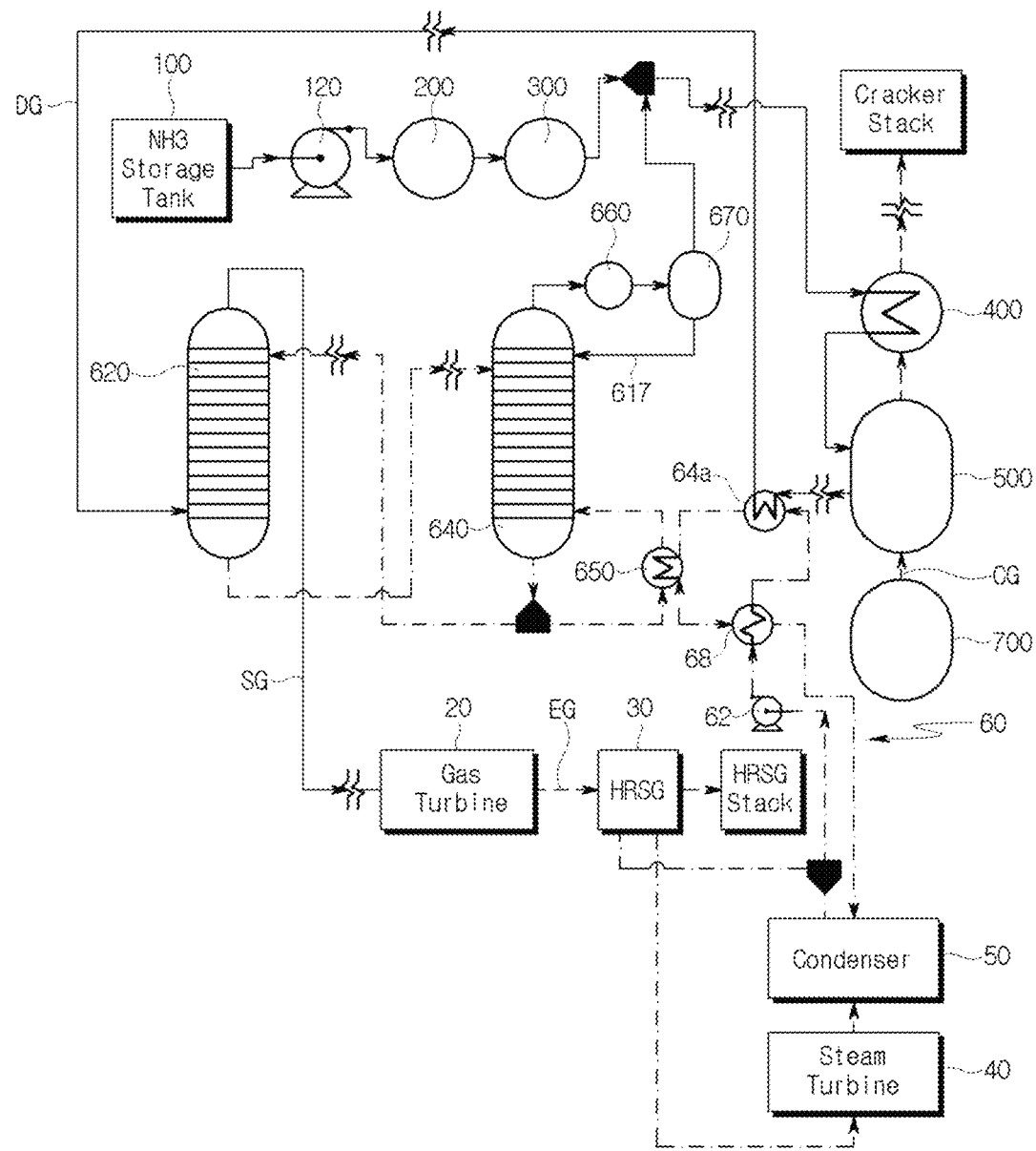
FIG. 4 is a schematic diagram of a gas turbine plant with an ammonia decomposition system according to an embodiment described herein.

Next, according to the embodiment shown in FIG. 4, water passing through the reboiler 650 indirectly exchanges heat with the decomposition gas (DG) through a heat transfer fluid. For this purpose, the plant further includes a steam turbine 40, a condenser 50 and a heat transfer fluid circuit 60.

The exhaust gas (EG) discharged from the gas turbine 20 is supplied to the heat recovery steam generator 30, and the steam generated by the heat of the exhaust gas (EG) in the heat recovery steam generator 30 is supplied to the steam turbine 40 and drives the steam turbine to produce electric power. After driving the steam turbine 40, the steam flows into the condenser 50 and is condensed by a coolant, and the water condensed in the condenser 50 is supplied back to the heat recovery steam generator 30.

The heat transfer fluid circuit 60 through which the heat transfer fluid flows includes a pump 62, a first heat exchanger 64a that absorbs heat by exchanging heat with the decomposition gas (DG), and the reboiler 650 that supplies heat by exchanging heat with water. That is, in the first heat exchanger 64a, direct heat exchange occurs between the heat transfer fluid and the decomposition gas (DG), so that the heat may be transferred from the decomposition gas (DG) to the heat transfer fluid. In the reboiler 650, direct heat exchange occurs between the heat transfer fluid and the water, so that the heat may be transferred from the heat transfer fluid to the water. That is, the decomposition gas (DG) discharged from the decomposition reactor 500 transfers heat to the heat transfer fluid through the first heat exchanger 64a and is then supplied to the ammonia absorption tower 620.

Here, a separate fluid (for example, antifreeze) unrelated to the plant may be supplied as the heat transfer fluid. However, in the embodiment, a portion of the water condensed in the condenser 50 is supplied as a heat transfer fluid to the heat transfer fluid circuit 60.

While the temperature of the water discharged after being condensed in the condenser 50 is generally about 15° C., the temperature of the water discharged from the reboiler 650 and entering the condenser 50 is still high, so that there is a burden of having to significantly lower the temperature in the condenser 50. To this end, the heat transfer fluid circuit 60 may further include an internal heat exchanger 68 in which the water discharged from the condenser 50 and the water entering the condenser 50 exchange heat. That is, as shown in FIG. 4, the water discharged from the condenser 50 may absorb heat while passing through the internal heat exchanger 68, may absorb heat while passing through the first heat exchanger 64a, and then may supply the heat while passing through the reboiler 650, and may supply heat while passing through the internal heat exchanger 68. Then, the water may flow back into the condenser 50. According to this, the water discharged from the reboiler 650 can transfer heat to the water entering the first heat exchanger 64a, thereby reducing the burden on the condenser 50 and improving efficiency.

Figure 5:
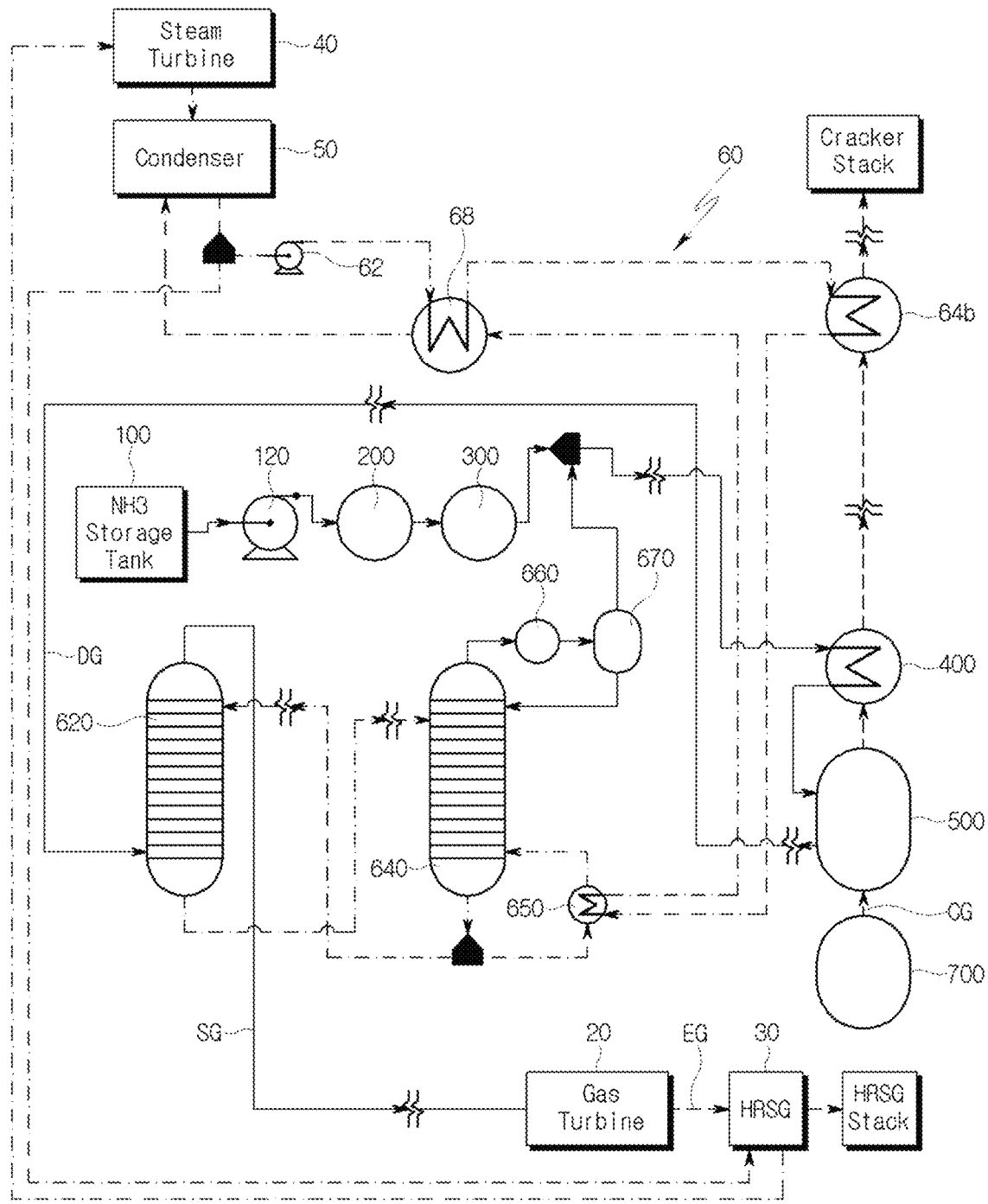
FIG. 5 is a schematic diagram of a gas turbine plant with an ammonia decomposition system according to an embodiment described herein.

Next, according to the embodiment shown in FIG. 5, water passing through the reboiler 650 indirectly exchanges heat with the combustion gas (CG) through the heat transfer fluid. For this purpose, the plant further includes the steam turbine 40, the condenser 50 and the heat transfer fluid circuit 60. The steam turbine 40 and the condenser 50 are the same as those described in FIG. 4.

The heat transfer fluid circuit 60 through which the heat transfer fluid flows includes a pump 62, a first heat exchanger 64b that absorbs heat by exchanging heat with the combustion gas (CG), and the reboiler 650 that supplies heat by exchanging heat with water. That is, in the first heat exchanger 64b, direct heat exchange occurs between the heat transfer fluid and the combustion gas (CG), so that the heat may be transferred from the combustion gas (CG) to the heat transfer fluid. In the reboiler 650, direct heat exchange occurs between the heat transfer fluid and the water, so that the heat may be transferred from the heat transfer fluid to the water. That is, the combustion gas (CG) discharged from the second combustor 700 supplies the heat while passing through the decomposition reactor 500 and the superheater 400, and then transfers the heat to the heat transfer fluid while passing through the first heat exchange unit 64b.

Likewise, a separate fluid (for example, antifreeze) unrelated to the plant may be supplied as the heat transfer fluid. However, in the embodiment, a portion of the water condensed in the condenser 50 is supplied as a heat transfer fluid to the heat transfer fluid circuit 60. Therefore, the heat transfer fluid circuit 60 may further include the internal heat exchanger 68 in which the water discharged from the condenser 50 and the water entering the condenser 50 exchange heat. In the internal heat exchanger 68, the water discharged from the reboiler 650 can transfer heat to the water entering the first heat exchanger 64b, thereby reducing the burden on the condenser 50 and improving efficiency.

Figure 6:
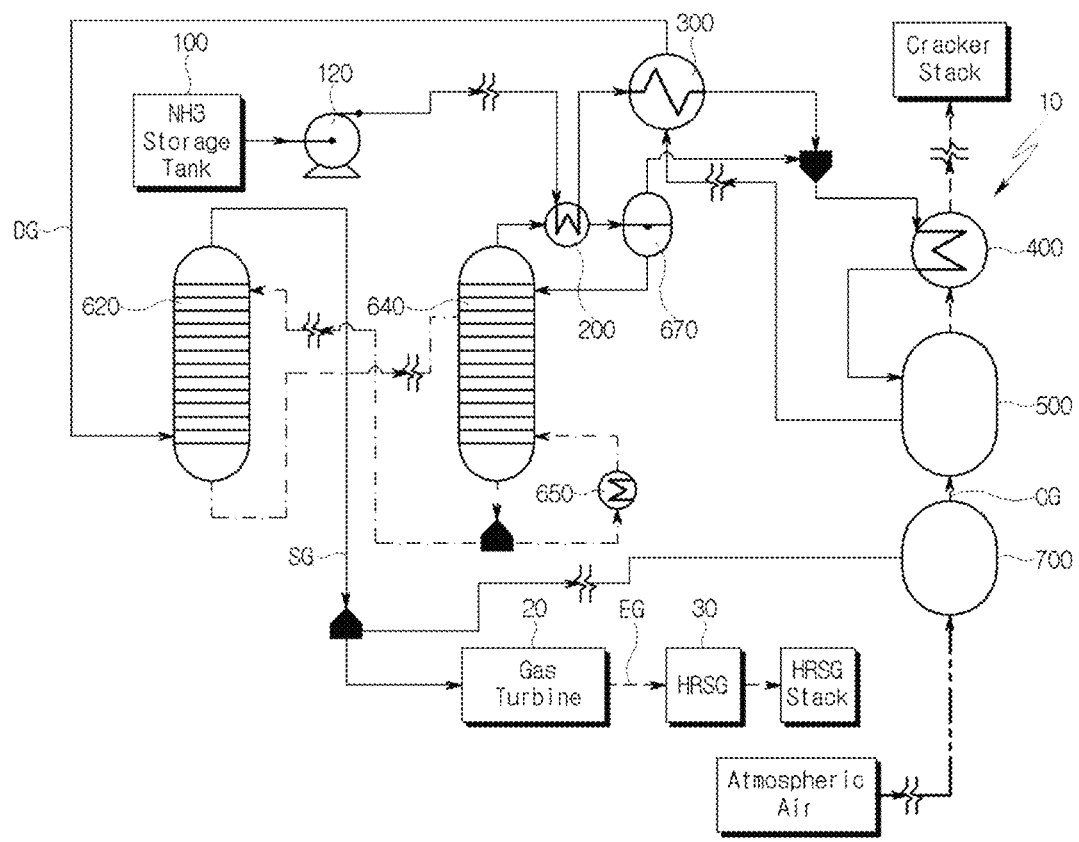
FIG. 6 is a schematic diagram of a gas turbine plant with an ammonia decomposition system according to an embodiment described herein.

Next, according to the embodiment shown in FIG. 6, the gaseous ammonia regenerated in the ammonia regeneration tower 640 exchanges heat with the liquid ammonia while passing through the preheater 200. That is, the embodiment shown in FIG. 6 can be regarded to have a configuration in which the condenser and the preheater are combined in the embodiment shown in FIG. 1. Accordingly, the regenerated gaseous ammonia may be cooled in the preheater 200 and condensed by a predetermined amount, and simultaneously with this, the liquid ammonia supplied to the vaporizer 300 may be heated, so the efficiency of the plant can be improved.

Likewise, the separation tank 670 is disposed downstream of the preheater 200 with respect to the separator 600 side and serves to separate the liquid ammonia condensed in the preheater 200 from the uncondensed gaseous ammonia by a density difference. The liquid ammonia separated by the separation tank 670 may be recovered back to the ammonia regeneration tower 640 through the ammonia recovery line 617. The separated gaseous ammonia may be mixed with the gaseous ammonia vaporized by the vaporizer 300 and may be supplied to the superheater 400.

While the embodiment shows that the decomposition gas (DG) discharged from the decomposition reactor 500 supplies heat to the liquid ammonia while passing through the vaporizer 300, the embodiment is not limited thereto. It is also possible that the decomposition gas (DG) can supply heat to the water through the reboiler 650.

Figure 7:
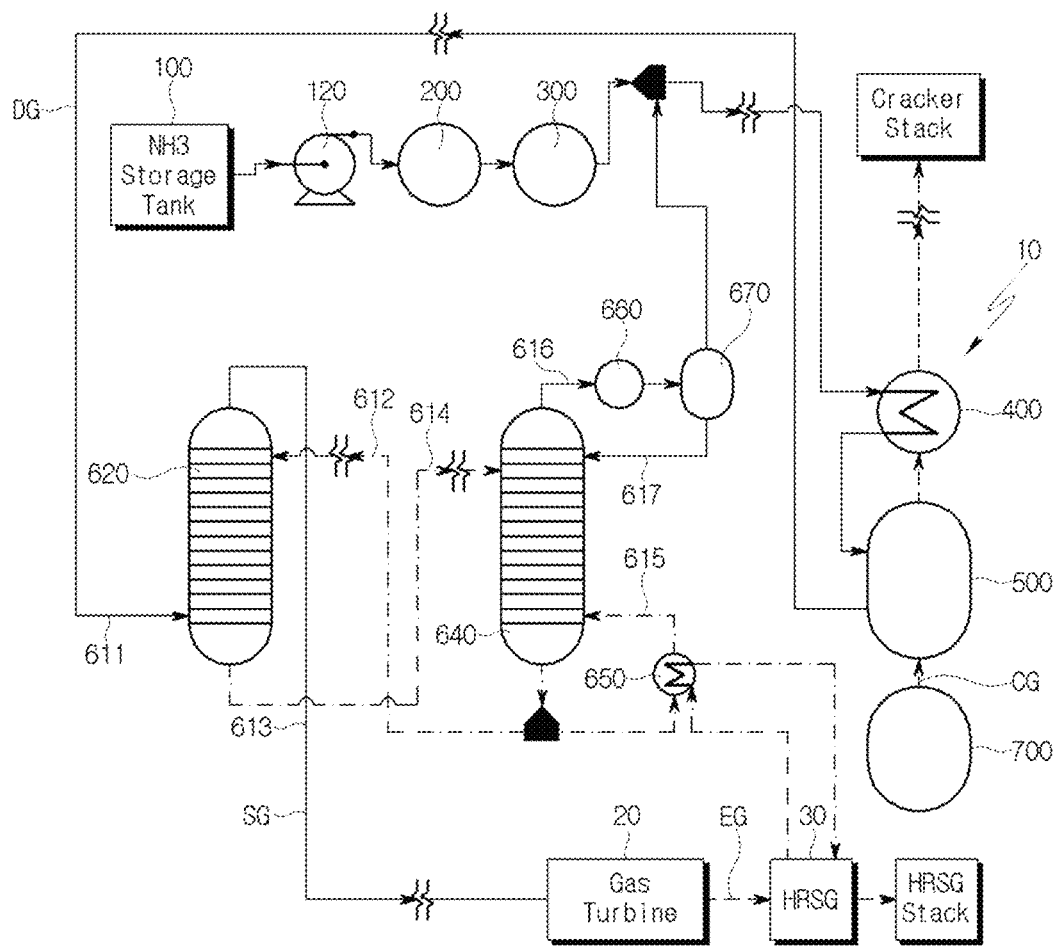
FIG. 7 is a schematic diagram of a gas turbine plant with an ammonia decomposition system according to an embodiment described herein.

Next, according to the embodiment shown in FIG. 7, water passing through the reboiler 650 is directly exchanging heat with steam or water extracted from the heat recovery steam generator 30. As discussed above, the exhaust gas (EG) discharged from the gas turbine 20 is supplied to the heat recovery steam generator 30, and water is heated by the heat of the exhaust gas (EG) in the heat recovery steam generator 30. The heated water or vaporized steam by the heat of the exhaust gas (EG) is extracted and supplied to the reboiler 650, thereby directly transferring heat to the water discharged from the ammonia regeneration tower 640. Accordingly, the water discharged from the ammonia regeneration tower 640 may be converted to vapor in the reboiler 650 by the heat of the water or steam extracted from the heat recovery steam generator 30. In addition, the water or steam extracted from the heat recovery steam generator 30 may be cooled and then returned to the heat recovery steam generator 30, particularly to a location where the temperature of the water or steam is lower than the temperature of a location where the water or steam is extracted within the heat recovery steam generator 30.

Figure 8:
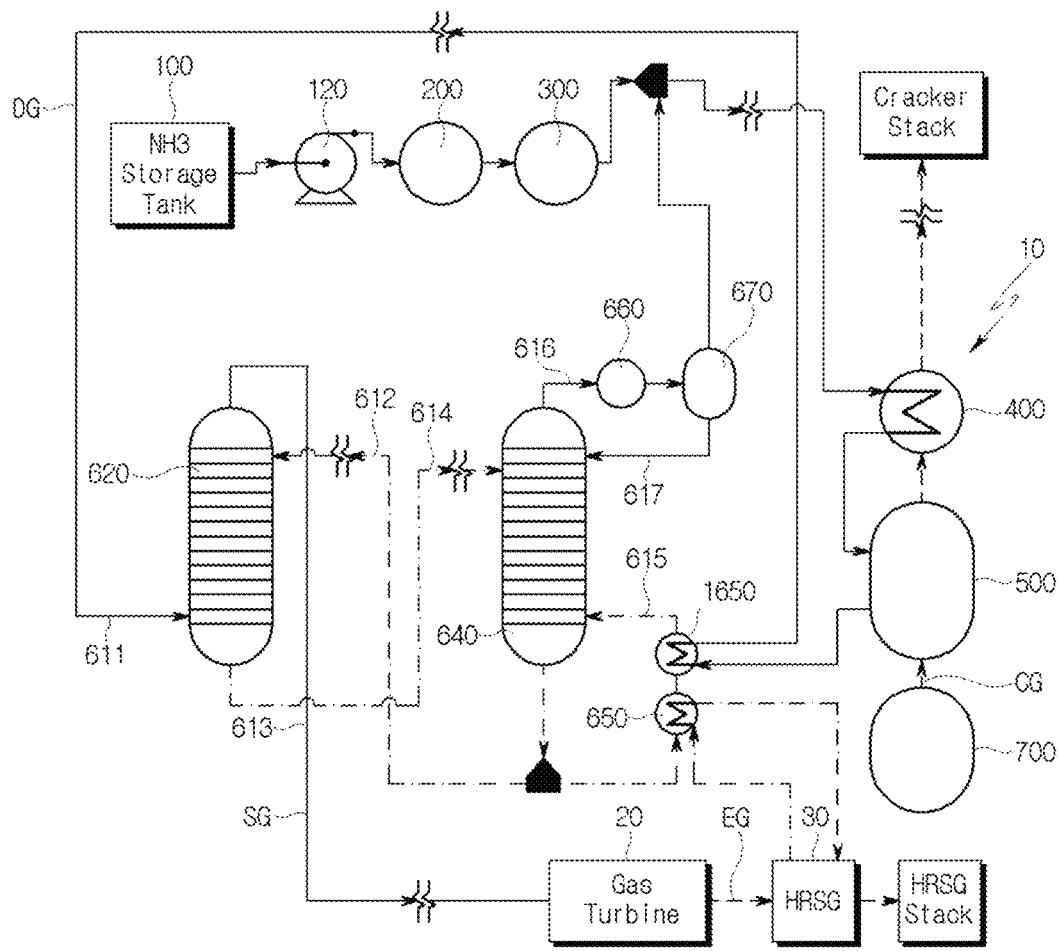
FIG. 8 is a schematic diagram of a gas turbine plant with an ammonia decomposition system according to an embodiment described herein.

Next, according to the embodiment shown in FIG. 8, an additional reboiler 1650 is further included in addition to the reboiler 650 according to FIG. 7. That is, two reboilers 650 and 1650 are included. While FIG. 8 shows that the additional reboiler 1650 is disposed downstream of the reboiler 650, it is also possible that the additional reboiler 1650 is disposed upstream of the reboiler 650.

In the embodiment, the additional reboiler 1650 is configured in the same manner as that of the reboiler 650 according to FIG. 1. That is, in the reboiler 650, the water discharged from the ammonia regeneration tower 640 and the water or steam extracted from the heat recovery steam generator 30 exchange heat, and in the additional reboiler 1650, the water discharged from the ammonia regeneration tower 640 and the decomposition gas (DG) exchange heat.

In this case, a heat source required to vaporize the water passing through the reboiler 650 into vapor may be distributed and obtained from the water or steam extracted from the heat recovery steam generator 30 and the decomposition gas (DG).

Although not shown, when the second combustor 700 is included, water passing through the additional reboiler 1650 and the combustion gas (CG) may exchange heat directly or indirectly.

Figure 9:
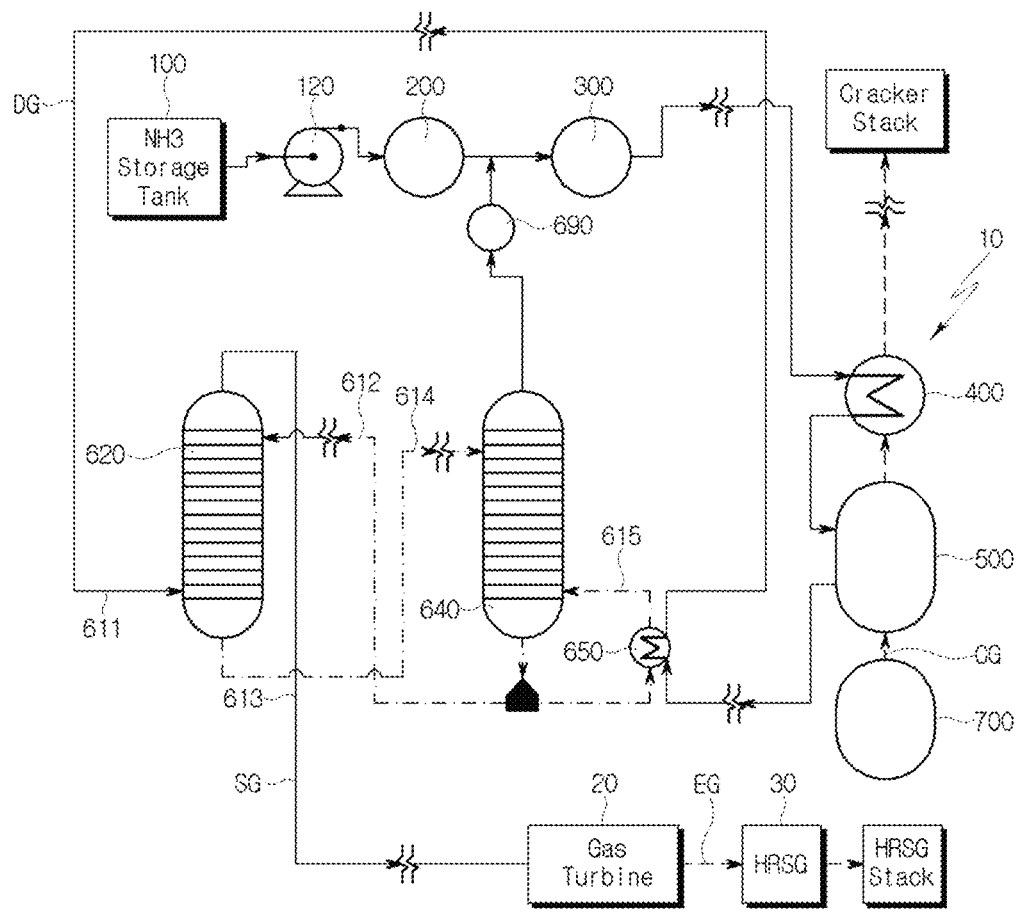
FIG. 9 is a schematic diagram of a gas turbine plant with an ammonia decomposition system according to an embodiment described herein.

Next, according to the embodiment shown in FIG. 9, it does not mean that the gaseous ammonia regenerated in the ammonia regeneration tower 640 is mixed with the gaseous ammonia vaporized by the vaporizer 300 and supplied to the superheater 400. The gaseous ammonia regenerated in the ammonia regeneration tower 640 is liquefied in a liquefier 690 and is then supplied to the vaporizer 300. For this purpose, the gaseous ammonia regenerated in the ammonia regeneration tower 640 may be supplied upstream of the supply pump 120, the preheater 200, or the vaporizer 300 and be mixed with the liquid ammonia. As an example, the liquid ammonia with a low temperature before passing through the preheater 200 may be used in order to liquefy gaseous ammonia in the liquefier 690. According to this, the ammonia regeneration tower 640 can be operated at a low pressure.

Figure 10:
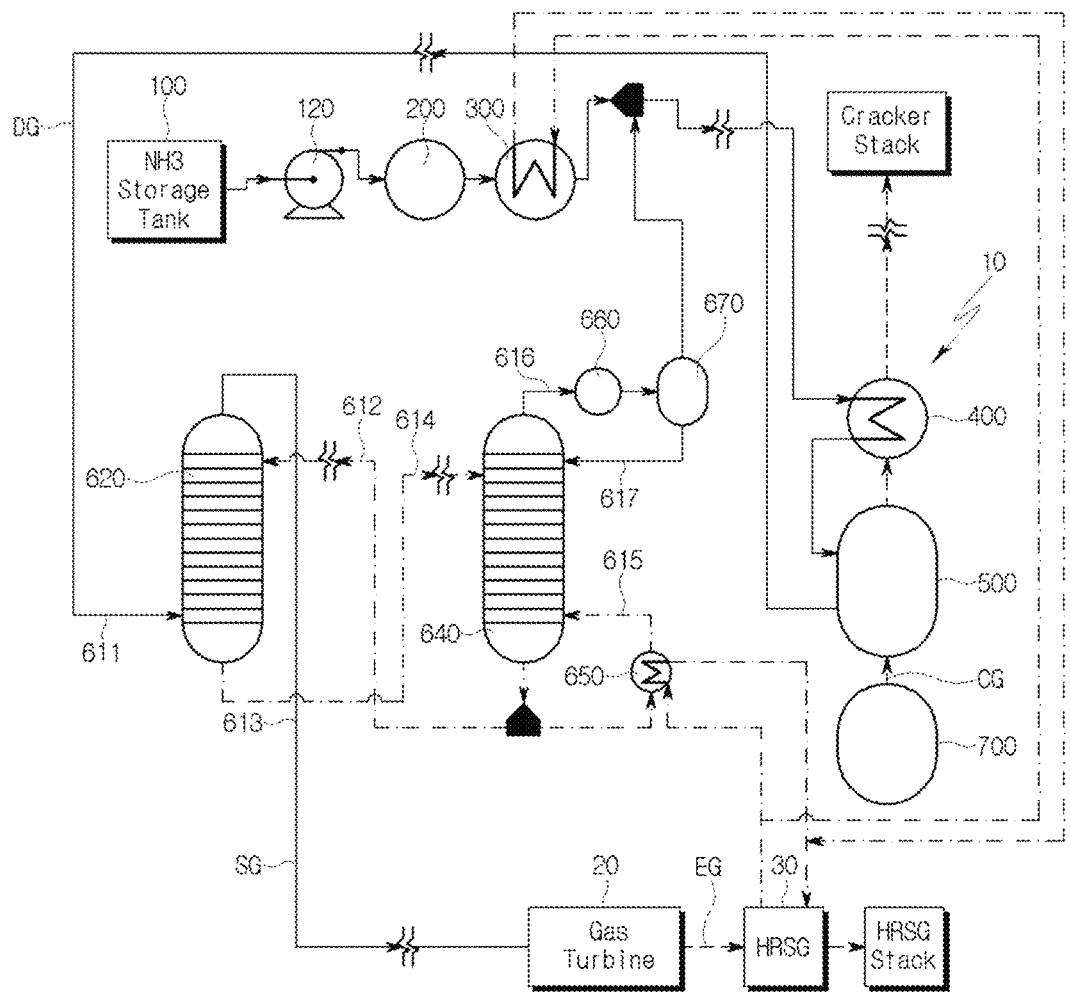
FIG. 10 is a schematic diagram of a gas turbine plant with an ammonia decomposition system according to an embodiment described herein.

Finally, FIG. 10 shows an embodiment in which a portion of the steam or water extracted from the heat recovery steam generator 30 is branched before being supplied to the reboiler 650 and supplied to the vaporizer 300. The steam or water extracted from the heat recovery steam generator 30 is branched, some of which heat the water discharged from the ammonia regeneration tower 640 in the reboiler 650, and some of which heat the liquid ammonia in the vaporizer 300. Thereafter, the branched steam or water may be mixed and recovered back to the heat recovery steam generator 30. Although the branched steam or water is shown in FIG. 10 as being supplied only to the vaporizer 300, the branched steam or water may be supplied to at least one of the preheater 200, the vaporizer 300, and the superheater 400.

The present invention is not limited to the described specific embodiments and descriptions described above. Various modifications can be made by anyone skilled in the art without departing from the subject matter of the present invention as defined by the appended claims. Such modifications fall within the scope of protection of the present invention.

REFERENCE NUMERALS

10: Ammonia Decomposition System
20: Gas Turbine
22: Compressor
24: First Combustor
26: Turbine
30: Heat Recovery Steam Generator
40: Steam Turbine
50: Condenser
60: Heat Transfer Fluid Circuit
62: Pump
64a, 64b: First Heat Exchanger
68: Internal Heat Exchanger
100: Storage Tank
120: Supply Pump
200: Preheater
300: Vaporizer
400: Superheater
500: Decomposition Reactor
600: Separator
611: Decomposition Gas Line
612: Water Line
613: Synthesis Gas Line
614: Ammonia Water Line
615: Vapor Line
616: Regeneration Ammonia Line
617: Ammonia Recovery Line
620: Ammonia Absorption Tower
640: Ammonia Regeneration Tower
650: Reboiler
660: Condenser
670: Separation Tank
680: Gas Compressor
690: Liquefier
700: Second Combustor
1650: Additional Reboiler
EG: Exhaust Gas
DG: Decomposition Gas
SG: Synthesis Gas
CG: Combustion Gas

What is claimed is:

1. A gas turbine plant with an ammonia decomposition system, the gas turbine plant comprising:
   a storage tank configured to store liquid ammonia;
   a supply pump configured to supply the liquid ammonia of the storage tank;
   a preheater configured to preheat the liquid ammonia supplied by the supply pump;
   a vaporizer configured to vaporize the liquid ammonia preheated by the preheater;
   a superheater configured to superheat gaseous ammonia vaporized by the vaporizer;
   a decomposition reactor configured to thermally decompose the gaseous ammonia superheated by the superheater;
   an ammonia absorption tower configured to separate residual ammonia from decomposition gas decomposed in the decomposition reactor and generate synthesis gas consisting of hydrogen and nitrogen; and
   an ammonia regeneration tower configured to evaporate and regenerate ammonia from ammonia water produced by dissolving the residual ammonia in water in the ammonia absorption tower,
   wherein the synthesis gas generated in the ammonia absorption tower is supplied to a first combustor of a gas turbine,
   wherein water discharged from the ammonia regeneration tower is branched and a portion of the water is supplied to the ammonia absorption tower, and the other portion is supplied back to the ammonia regeneration tower through a reboiler, and
   wherein the water passing through the reboiler directly or indirectly exchanges heat with the decomposition gas.

2. The gas turbine plant with an ammonia decomposition system of claim 1, wherein the gaseous ammonia regenerated in the ammonia regeneration tower is mixed with the gaseous ammonia vaporized in the vaporizer and is supplied to the superheater.

3. The gas turbine plant with an ammonia decomposition system of claim 2, wherein the gaseous ammonia regenerated in the ammonia regeneration tower is compressed by a gas compressor before being mixed with the gaseous ammonia vaporized in the vaporizer.

4. The gas turbine plant with an ammonia decomposition system of claim 1, further comprising a heat transfer fluid circuit through which a heat transfer fluid flows,
   wherein the heat transfer fluid circuit comprises a pump, a first heat exchanger that absorbs heat by exchanging heat with the decomposition gas, and the reboiler that supplies heat by exchanging heat with water.

5. A gas turbine plant with an ammonia decomposition system, the gas turbine plant comprising:
   a storage tank configured to store liquid ammonia;
   a supply pump configured to supply the liquid ammonia of the storage tank;
   a preheater configured to preheat the liquid ammonia supplied by the supply pump;
   a vaporizer configured to vaporize the liquid ammonia preheated by the preheater;
   a superheater configured to superheat gaseous ammonia vaporized by the vaporizer;
   a decomposition reactor configured to thermally decompose the gaseous ammonia superheated by the superheater;
   an ammonia absorption tower configured to separate residual ammonia from decomposition gas decomposed in the decomposition reactor and generate synthesis gas consisting of hydrogen and nitrogen; and
   an ammonia regeneration tower configured to evaporate and regenerate ammonia from ammonia water produced by dissolving the residual ammonia in water in the ammonia absorption tower,
   wherein the synthesis gas generated in the ammonia absorption tower is supplied to a first combustor of a gas turbine,
   further comprising a second combustor that generates combustion gas such that heat is supplied to the decomposition reactor,
   wherein water discharged from the ammonia regeneration tower is branched and a portion of the water is supplied to the ammonia absorption tower, and the other portion is supplied back to the ammonia regeneration tower through a reboiler, and
   wherein the water passing through the reboiler directly or indirectly exchanges heat with the combustion gas.

6. The gas turbine plant with an ammonia decomposition system of claim 5, further comprising a heat transfer fluid circuit through which a heat transfer fluid flows,
   wherein the heat transfer fluid circuit comprises a pump, a first heat exchanger that absorbs heat by exchanging heat with the combustion gas, and the reboiler that supplies heat by exchanging heat with water.

7. The gas turbine plant with an ammonia decomposition system of claim 4,
   wherein exhaust gas discharged from the gas turbine is supplied to a heat recovery steam generator,
   wherein steam generated by heat of the exhaust gas in the heat recovery steam generator is supplied to a steam turbine and drives the steam turbine, and then flows into a condenser, and water condensed in the condenser is supplied back to the heat recovery steam generator, and
   wherein a portion of the water condensed in the condenser is supplied as the heat transfer fluid to the heat transfer fluid circuit.

8. The gas turbine plant with an ammonia decomposition system of claim 7, wherein the heat transfer fluid circuit further comprises an internal heat exchanger in which the water discharged from the condenser and the water entering the condenser exchange heat.

9. The gas turbine plant with an ammonia decomposition system of claim 8, wherein the water discharged from the condenser absorbs heat while passing through the internal heat exchanger, absorbs heat while passing through the first heat exchanger, and then supplies the heat while passing through the reboiler, supplies heat while passing through the internal heat exchanger, and then flows back into the condenser.

10. The gas turbine plant with an ammonia decomposition system of claim 6,
    wherein exhaust gas discharged from the gas turbine is supplied to a heat recovery steam generator,
    wherein steam generated by heat of the exhaust gas in the heat recovery steam generator is supplied to a steam turbine and drives the steam turbine, and then flows into a condenser, and water condensed in the condenser is supplied back to the heat recovery steam generator, and
    wherein a portion of the water condensed in the condenser is supplied as the heat transfer fluid to the heat transfer fluid circuit.

11. The gas turbine plant with an ammonia decomposition system of claim 10, wherein the heat transfer fluid circuit further comprises an internal heat exchanger in which the water discharged from the condenser and the water entering the condenser exchange heat.

12. The gas turbine plant with an ammonia decomposition system of claim 5,
wherein the combustion gas supplies heat while passing through the decomposition reactor and the superheater, and
wherein the water passing through the reboiler is supplied with heat directly or indirectly from the combustion gas that has passed through the decomposition reactor and the superheater.

13. The gas turbine plant with an ammonia decomposition system of claim 1, wherein the gaseous ammonia regenerated in the ammonia regeneration tower exchanges heat with the liquid ammonia while passing through the preheater.

14. The gas turbine plant with an ammonia decomposition system of claim 13, further comprising a separation tank that separates the liquid ammonia condensed as the gaseous ammonia regenerated in the ammonia regeneration tower passes through the preheater from uncondensed gaseous ammonia,
wherein the liquid ammonia separated in the separation tank is recovered back to the ammonia regeneration tower, and the separated gaseous ammonia is mixed with the gaseous ammonia vaporized by the vaporizer and is supplied to the superheater.

15. The gas turbine plant with an ammonia decomposition system of claim 1,
wherein water discharged from the ammonia regeneration tower is branched and a portion of the water is supplied to the ammonia absorption tower, and the other portion is supplied back to the ammonia regeneration tower through a reboiler,
wherein exhaust gas discharged from the gas turbine is supplied to a heat recovery steam generator, and the water is heated by heat of the exhaust gas in the heat recovery steam generator, and
wherein the water passing through the reboiler exchanges heat with steam or water extracted from the heat recovery steam generator.

16. The gas turbine plant with an ammonia decomposition system of claim 15, further comprising an additional reboiler that is disposed upstream or downstream of the reboiler,
wherein water passing through the additional reboiler directly or indirectly exchanges heat with the decomposition gas.

17. The gas turbine plant with an ammonia decomposition system of claim 15, further comprising:
a second combustor that generates combustion gas such that heat is supplied to the decomposition reactor; and
an additional reboiler that is disposed upstream or downstream of the reboiler,
wherein water passing through the additional reboiler directly or indirectly exchanges heat with the combustion gas.

18. The gas turbine plant with an ammonia decomposition system of claim 1, wherein the gaseous ammonia regenerated in the ammonia regeneration tower is liquefied in a liquefier, and is then supplied to the vaporizer.

19. A gas turbine plant with an ammonia decomposition system, the gas turbine plant comprising:
a storage tank configured to store liquid ammonia;
a supply pump configured to supply the liquid ammonia of the storage tank;
a preheater configured to preheat the liquid ammonia supplied by the supply pump;
a vaporizer configured to vaporize the liquid ammonia preheated by the preheater;
a superheater configured to superheat gaseous ammonia vaporized by the vaporizer;
a decomposition reactor configured to thermally decompose the gaseous ammonia superheated by the superheater;
an ammonia absorption tower configured to separate residual ammonia from decomposition gas decomposed in the decomposition reactor and generate synthesis gas consisting of hydrogen and nitrogen; and
an ammonia regeneration tower configured to evaporate and regenerate ammonia from ammonia water produced by dissolving the residual ammonia in water in the ammonia absorption tower,
wherein the synthesis gas generated in the ammonia absorption tower is supplied to a first combustor of a gas turbine,
wherein water discharged from the ammonia regeneration tower is branched and a portion of the water is supplied to the ammonia absorption tower, and the other portion is supplied back to the ammonia regeneration tower through a reboiler,
wherein exhaust gas discharged from the gas turbine is supplied to a heat recovery steam generator, and the water is heated by heat of the exhaust gas in the heat recovery steam generator,
wherein the water passing through the reboiler exchanges heat with steam or water extracted from the heat recovery steam generator, and
wherein a portion of the steam or water extracted from the heat recovery steam generator is branched before being supplied to the reboiler, and is supplied to at least one of the preheater, the vaporizer and the superheater.

* * * * *